United States Patent
Sone et al.

(10) Patent No.: US 7,153,213 B2
(45) Date of Patent: Dec. 26, 2006

(54) FIXED TYPE CONSTANT VELOCITY JOINT AND METHOD OF PRODUCING THE SAME

(75) Inventors: Keisuke Sone, Iwata (JP); Masafumi Nakakoji, Iwata (JP)

(73) Assignee: NTN Corporation, Osaka-Fu (JP)

( * ) Notice: Subject to any disclaimer, the term of this patent is extended or adjusted under 35 U.S.C. 154(b) by 0 days.

(21) Appl. No.: 10/669,153

(22) Filed: Sep. 22, 2003

(65) Prior Publication Data

US 2004/0102251 A1    May 27, 2004

(30) Foreign Application Priority Data

Sep. 26, 2002    (JP)    ............................. 2002-281595

(51) Int. Cl.
*F16D 3/223*    (2006.01)
(52) U.S. Cl. .................... 464/145; 464/906
(58) Field of Classification Search ............... 464/145, 464/146, 906
See application file for complete search history.

(56) References Cited

U.S. PATENT DOCUMENTS

| | | | |
|---|---|---|---|
| 3,879,960 A * | 4/1975 | Welschof et al. ........... | 464/145 |
| 4,608,028 A * | 8/1986 | Welschof et al. ........... | 464/145 |
| 4,950,206 A | 8/1990 | Jacob ......................... | 464/140 |
| 5,453,052 A * | 9/1995 | Harz et al. .................. | 464/145 |
| 5,549,514 A * | 8/1996 | Welschof ..................... | 464/145 |
| 5,616,081 A * | 4/1997 | Krude et al. ................ | 464/145 |
| 2002/0082094 A1 | 6/2002 | Hofmann et al. ........... | 464/178 |
| 2002/0094230 A1 | 7/2002 | Weckerling et al. ........ | 403/145 |

FOREIGN PATENT DOCUMENTS

| | | |
|---|---|---|
| DE | 100 60 220 | 6/2002 |
| EP | 1 347 190 A1 | 9/2003 |
| EP | 1 347 191 A1 | 9/2003 |
| JP | 06-193645 | 7/1994 |
| JP | 07-098023 | 4/1995 |
| WO | WO 91/01453 | 2/1991 |

* cited by examiner

*Primary Examiner*—Greg Binda
(74) *Attorney, Agent, or Firm*—J.C. Patents

(57) ABSTRACT

A fixed type constant velocity joint includes a cylindrical joint outer ring having an inner spherical surface formed with circumferentially equispaced axially extending track grooves, a joint inner ring having an outer spherical surface formed with circumferentially equispaced axially extending track grooves, balls disposed in ball tracks defined by cooperation between the track grooves in the joint outer and inner rings, and a cage for holding the balls in the ball tracks. The rear open end of the joint outer ring has an inner diameter larger than the outer diameter of the joint inner ring, an inner diameter surface of said cage is a surface having a shape such that the region located forwardly of the axial center is capable of controlling the forward movement of the joint inner ring while the region located rearwardly of the axial center is capable of allowing the axial movement of the joint inner ring.

5 Claims, 15 Drawing Sheets

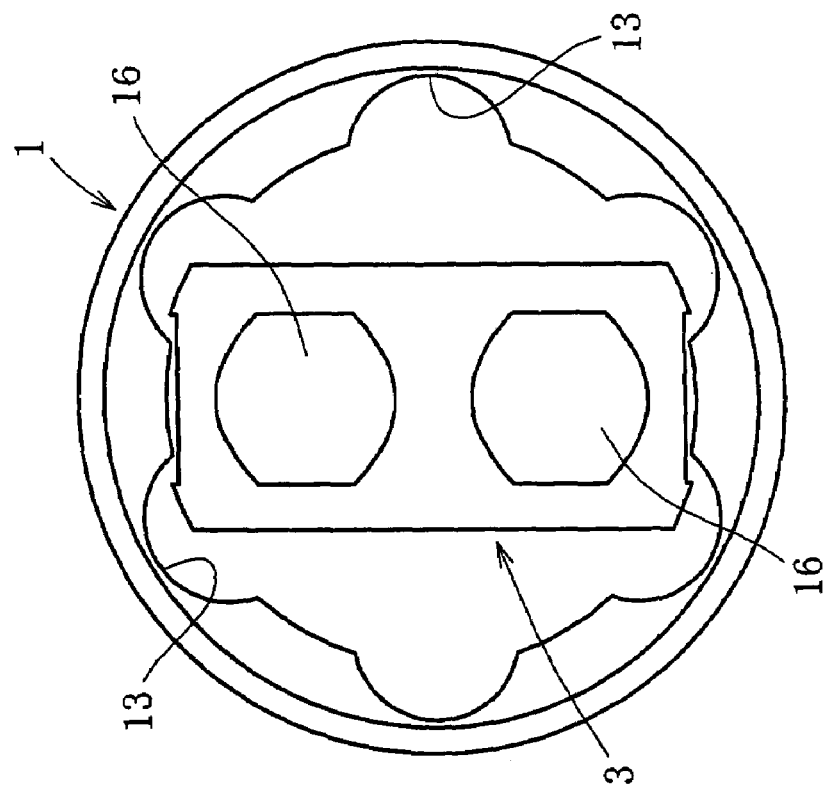
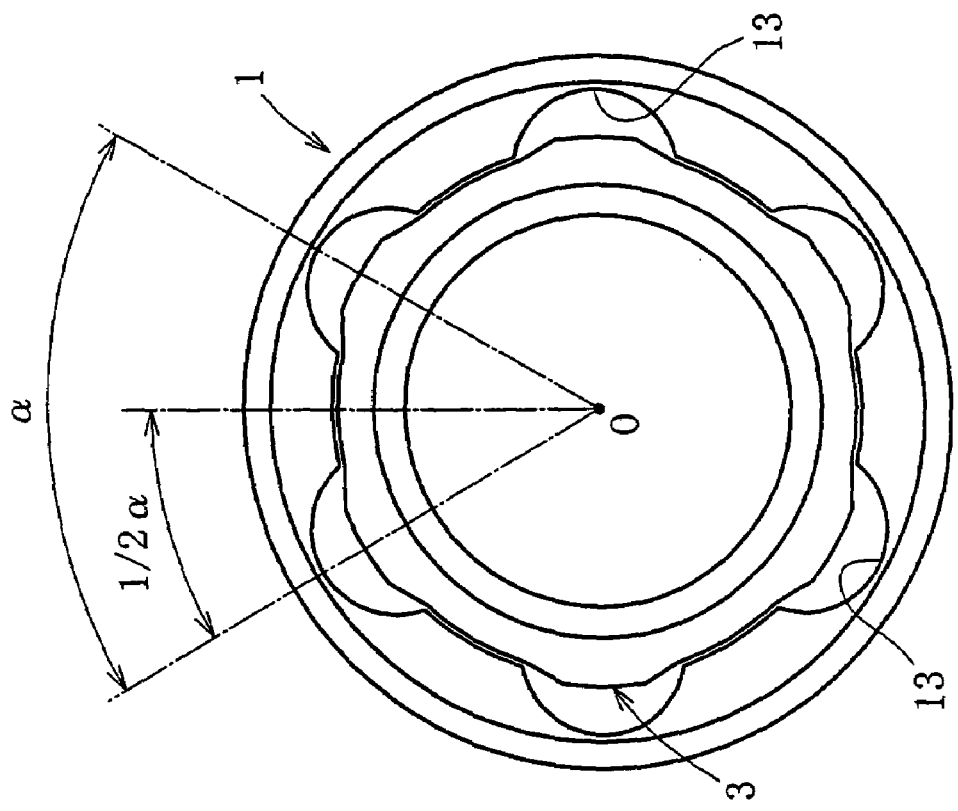
Fig. 5(a)
Fig. 5(b)

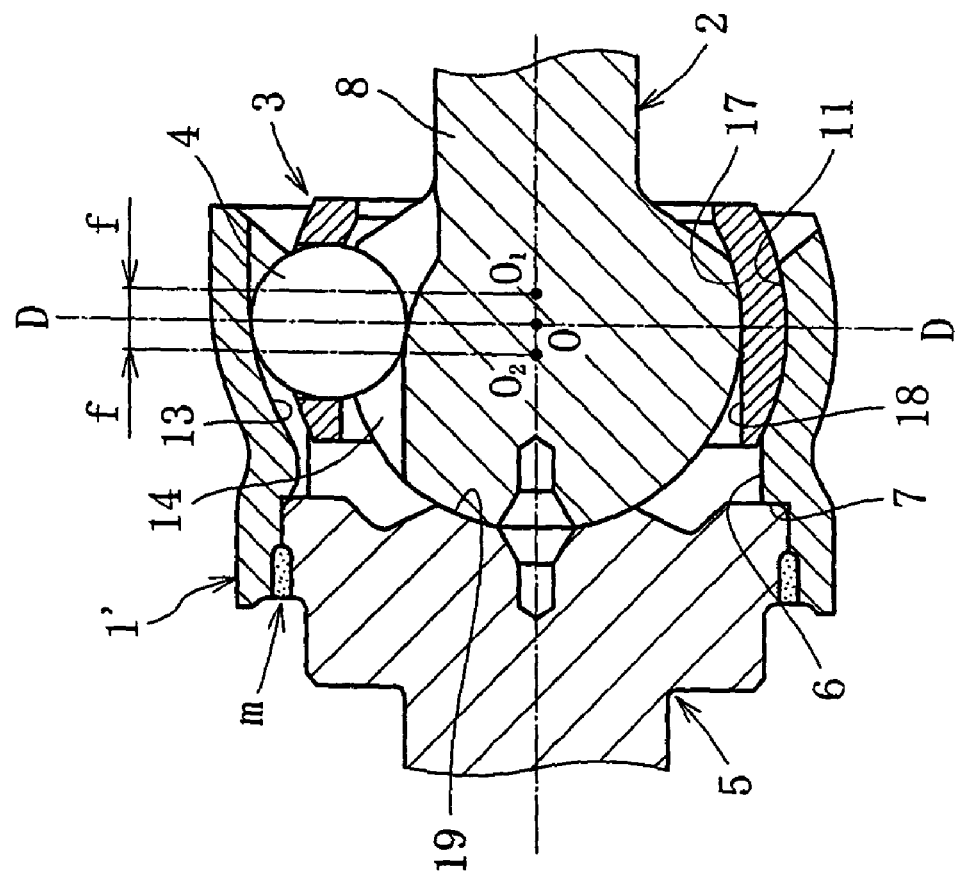
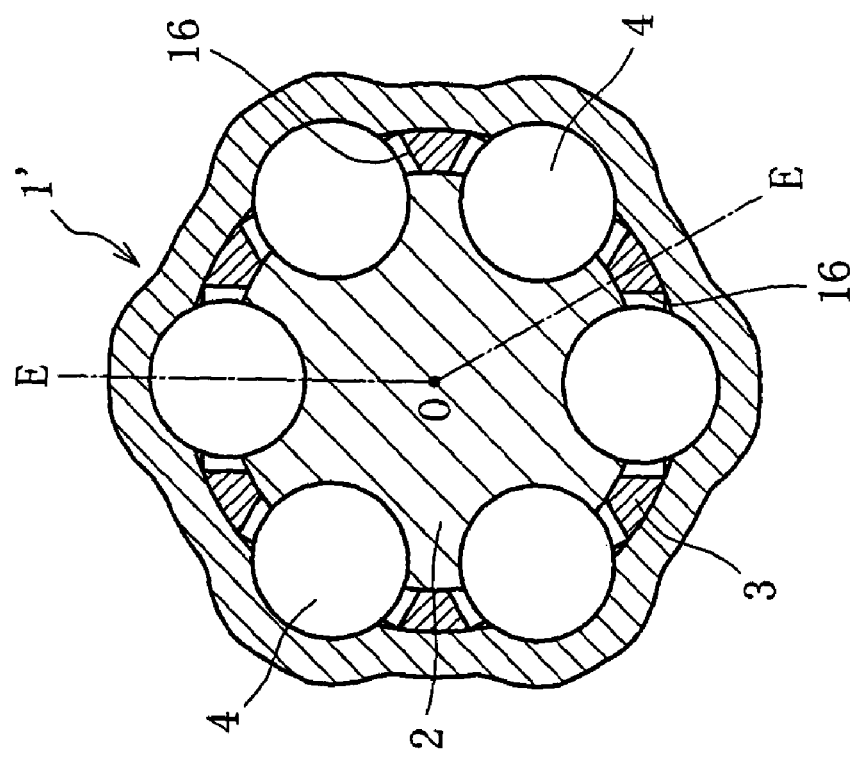
Fig. 9(a)
Fig. 9(b)

FIXED TYPE CONSTANT VELOCITY JOINT AND METHOD OF PRODUCING THE SAME

BACKGROUND OF THE INVENTION

1. Field of the Invention

The invention relates to a fixed type constant velocity joint used in power transmission systems for automobiles and various industrial machines, for example, and adapted to only allow working angle displacement between two shafts on the driving and driven sides.

2. Brief Description of the Prior Art

The fixed type constant velocity joint is available, for example, in the UJ (undercut free) type. This fixed type constant velocity joint has a construction comprising a joint outer ring having an inner spherical surface formed with a plurality of circumferentially equispaced axially extending track grooves, a joint inner ring having an outer spherical surface formed with circumferentially equispaced axially extending track grooves paired with the track grooves in the joint outer ring, a plurality of balls disposed in ball tracks defined by cooperation between the track grooves in the joint outer and inner rings, a cage having pockets for holding the balls disposed in the ball tracks, and a receiving member formed with a concave spherical surface disposed in the bottom of the joint outer ring to axially support the outer peripheral surface of the joint inner ring.

The assembling procedure for this fixed type constant velocity joint is as follows. First, the cage is fitted in the joint outer ring to assume its normal position, and then the joint inner ring is axially inserted and pushed in until it abuts against the bottom of the joint outer ring. Thereupon, the balls are axially inserted into the cage pockets along the track grooves in the joint inner ring, whereby they are fitted in the track grooves in the joint outer ring. Thereafter, the joint inner ring is pulled back toward the open end of the joint outer ring, whereby the joint inner ring assumes its normal position while the balls are fitted in the track grooves in the joint inner ring (refer to, for example, Japanese Patent Kokai No. Heisei 6-193645 (pp. 4–6, FIGS. 6–9, and FIGS. 15–18), which is hereinafter referred to as Patent Document 1).

Further, other fixed type constant velocity joints include the BJ (Ball Fixed Joint) type. This fixed type constant velocity joint has substantially the same construction as that of the UJ type described above. That is, it has a construction comprising a joint outer ring having an inner spherical surface formed with a plurality of circumferentially equispaced axially extending track grooves, a joint inner ring having an outer spherical surface formed with a plurality of circumferentially equispaced axially extending track grooves paired with the tracks in the joint outer ring, a plurality of balls disposed in ball tracks defined by cooperation between the track grooves in the joint outer and inner rings, and a cage having pockets for holding the balls disposed in the ball tracks.

The assembling procedure for this fixed type constant velocity joint is as follows. First, the cage is inserted into the joint outer ring with the center axis of the cage disposed orthogonal to the central axis of the joint outer ring. After this cage insertion, the cage is turned by 90° to bring the central axis of the cage into coincidence with the central axis of the joint outer ring. And the pockets in the cage are opposed to the track grooves in the joint outer ring and balls are inserted into all of the pockets. Thereafter, the central axis of the joint inner ring is brought into coincidence with an extension of the central axis of the joint outer ring having received therein the cage having the balls inserted in its pockets, and with the two central axes held coincident with each other, the joint inner ring is pushed into the cage (refer to, for example, Japanese Patent Kokai No. Heisei 7-98023 (pp. 2–3, FIGS. 1–4), which is hereinafter referred to as Patent Document 2).

In this connection, with the fixed type constant velocity joint disclosed in Patent Document 1, the assembling method therefor results in shallowing the track grooves, thus reducing the torque load capacity. That is, in the assembling of this fixed type constant velocity joint, in order to make it possible, after insertion of the cage into the joint outer ring, to insert the joint inner ring into the cage and push it to the bottom of the joint outer ring, the outer diameter of the joint inner ring is set smaller than the inner diameter of the cage. Here, since the outer diameter of an intermediate shaft fitted to the joint inner ring is of specified value, the track grooves in the joint inner ring will be shallowed if the outer diameter of the joint inner ring is reduced. This results in a problem that the torque load capacity of the constant velocity joint becomes smaller.

Further, with the fixed type constant velocity joint disclosed in Patent Document 1, the construction is such that the concave spherical surface of the receiving member disposed in the bottom of the joint outer ring axially supports the outer spherical surface of the joint inner ring. Since the concave spherical surface of the receiving member axially supporting the joint inner ring in this manner is positioned around the joint central axis and its support range is narrow, it is difficult to retain the constant velocity property during operation at a large operating angle, producing problems including vibration and abnormal sound, and a large relative displacement between the concave spherical surface of the receiving member and the outer spherical surface of the joint inner ring; thus, there is a fear that the heat generating rate increases.

Further, with the fixed type constant velocity joint disclosed in Patent Document 2, its assembling method is such that in pushing the joint inner ring into the cage with respect to the joint outer ring receiving the cage, the elastic deformation of the joint inner or outer ring is utilized. It is difficult to control the amount of elastic deformation of the joint inner or outer ring, and if the amount of elastic deformation is too large, the assemblability is degraded, with an excessive load applied between the balls and the tracks, tending to damage the area of contact between the two members, leading to a fear that the durability is lowered.

Further, according to the assembling method for the fixed type constant velocity joint disclosed in Patent Document 2, the central axis of the joint inner ring is brought into coincidence with an extension of the central axis of the joint outer ring, and with the two central axes held coincident with each other, the joint inner ring is pushed into the cage. In the case of the BJ type constant velocity joint in the Patent Document 2, the track groove bottom of the joint inner ring is rounded to make it easy to push the joint inner ring into the inner diameter of the cage, which cage, with balls inserted in its pockets, is received in the joint outer ring. If it is applied to the constant velocity joint of the UJ type, however, the track grooves in the joint inner ring of the constant velocity joint of the UJ type have a straight bottom, and since this straight bottom is positioned on the insertion side of the joint inner ring, the straight portions of the track grooves in the joint inner ring are large in relation to the inner diameter of the of the cage, which, with balls inserted

SUMMARY OF THE INVENTION

It is an object of the present invention to be capable of securing a sufficient torque load capacity, maintaining the constant velocity property, and facilitating the assembling of components consisting of a joint outer ring, a cage, balls and a joint inner ring.

The present invention provides a fixed type constant velocity joint to be characterized by comprising a cylindrical joint outer ring having an inner spherical surface formed with a plurality of circumferentially equispaced axially extending track grooves, a joint inner ring having an outer spherical surface formed with circumferentially equispaced axially extending track grooves paired with the track grooves in the joint outer ring, a plurality of torque transmitting balls disposed in ball tracks defined by cooperation between the track grooves in the joint outer and inner rings, and a cage for holding the torque transmitting balls disposed in said ball tracks, wherein the rear open end of said joint outer ring has an inner diameter larger than the outer diameter of the joint inner ring, the inner diameter surface of said cage is a surface having a shape such that the region located forwardly of the axial center is capable of controlling the forward movement of the joint inner ring while the region located rearwardly of the axial center is capable of allowing the axial movement of the joint inner ring.

Further, a method according to the invention for producing a fixed type constant velocity joint is characterized by comprising the steps of inserting a cage through the front open end of a cylindrical joint outer ring to dispose the cage in its normal position within a joint inner ring, insertion-installing torque transmitting balls into the cage coinciding with a plurality of circumferentially equispaced axially extending track grooves formed in the inner spherical surface of said joint outer ring, inserting a joint inner ring through the rear open end of the joint outer ring having an inner diameter larger than the outer diameter of said joint inner ring to pass the joint inner ring through a surface located rearwardly of the axial center of the cage and having a shape enabling the axial movement of the joint inner ring, thereby disposing the joint inner ring in its normal position.

Here, as the inner diameter surface of the cage formed in the region located forwardly of the axial center of the cage, that is, as "a surface having a shape capable of controlling the forward movement of the joint inner ring," a inner spherical surface contacting the outer spherical surface of the joint inner ring is effective; however, other shapes than this inner spherical surface may be used. Further, as the inner diameter surface of the cage formed in the region located rearwardly of the axial center thereof, that is, as "a surface having a shape capable of allowing the axial movement of the joint inner ring," an inner cylindrical surface contacting the outer spherical surface of the joint inner ring is effective; however, other shapes than this inner cylindrical surface may be used.

Further, as "the rear open end (front open end) of the joint outer ring" means the open end (the axially opposite open end) positioned on the side where the joint outer ring is connected to other part such as the stem shaft. Further, "the region located rearwardly (forwardly) of the axial center" means the side (its axially opposite side) where with the cage incorporated into the joint outer ring to assume its normal position, that is, with the axial center of the cage coinciding with the joint center, said joint outer ring is connected to the other part, such as the stem shaft.

In the fixed type constant velocity joint according to the invention, in assembling the components consisting of a joint outer ring, a cage, balls and a joint inner ring, first, the cage is inserted through the front open end of the joint outer ring to assume its normal position, whereupon all of the torque transmitting balls are inserted into the cage. Then, in incorporating the joint inner ring, the joint inner ring can be inserted into the cage through the rear open end of the joint outer ring to assume its normal position since the rear open end of the joint outer ring has an inner diameter larger than the outer diameter of the joint inner ring and since a surface having a shape capable of allowing the axial movement of the joint inner ring, for example, an inner cylindrical surface is formed on the rear side of the cage spaced from the axial center of the inner diameter surface of the cage; thus, the assembling of the components can be simplified.

With this fixed type constant velocity joint, the construction in which the outer spherical surface is formed to extend to the rear of the joint inner ring while the concave spherical surface is formed in the end surface of a receiving section located rearwardly of said joint inner ring, and the concave spherical surface of the receiving section axially supports the outer spherical surface of said joint inner ring, results in the inner cylindrical surface of the cage radially supporting the outer spherical surface of the joint inner ring, thereby making it possible to secure a sufficient torque load capacity, to prevent vibration and abnormal sound, and to maintain the constant velocity property. Further, since the force acting on the outer spherical surface of the joint inner ring is dispersed between the inner cylindrical surface of the cage and the concave spherical surface of the receiving member in the rear, the generation of heat in the concave spherical surface of the receiving member is suppressed to prevent seizure. In addition, the outer spherical surface formed in the rear of the joint inner ring may be provided by a member separate from the joint inner ring.

Here, if the radius of curvature of the outer spherical surface of the joint inner ring is set smaller than the radius of curvature of the inner spherical surface of the cage, then it is possible to reduce contact between the joint inner ring and the cage to make smooth the movement of the cage, thus reducing the force from the balls that acts on the cage.

The invention is applicable to a fixed type constant velocity joint having eight torque transmitting balls, the ball PCD can be reduced for size compaction.

In addition, as a receiving construction for axially supporting the joint inner ring, there may be contemplated a form composed of a stem shaft fixed to the rear open end of the joint outer ring, a form composed of a receiving member having a concave spherical surface formed in its end surface, and a stem shaft fixed to the rear end open end of the joint outer ring through the receiving member, and a form composed of a receiving member having a concave spherical surface formed in its end surface and directly fixed to the rear open end of the joint outer ring.

Further, the track grooves in said joint inner ring are formed within the range of a maximum operating angle and the area outside the range is formed with buildups to control the axial length of the track grooves. With this construction, the strength between track grooves in the joint inner ring can be secured and the spacing between track grooves can be narrowed, thus making it possible to achieve size compaction of the constant velocity joint.

BRIEF DESCRIPTION OF THE DRAWINGS

FIG. 5 shows an embodiment of the invention, wherein (a) is a side view showing an example of procedure for assembling the cage to the joint outer ring, and (b) is a side view showing another example of procedure for assembling the cage to the joint outer ring;

FIG. 9, which shows another embodiment of the invention, wherein (a) is a sectional view taken along the line E-O-E in (b), which is a sectional view taken along the line D-O-D in (a);

DESCRIPTION OF THE PREFERRED EMBODIMENTS

Figure 1A:
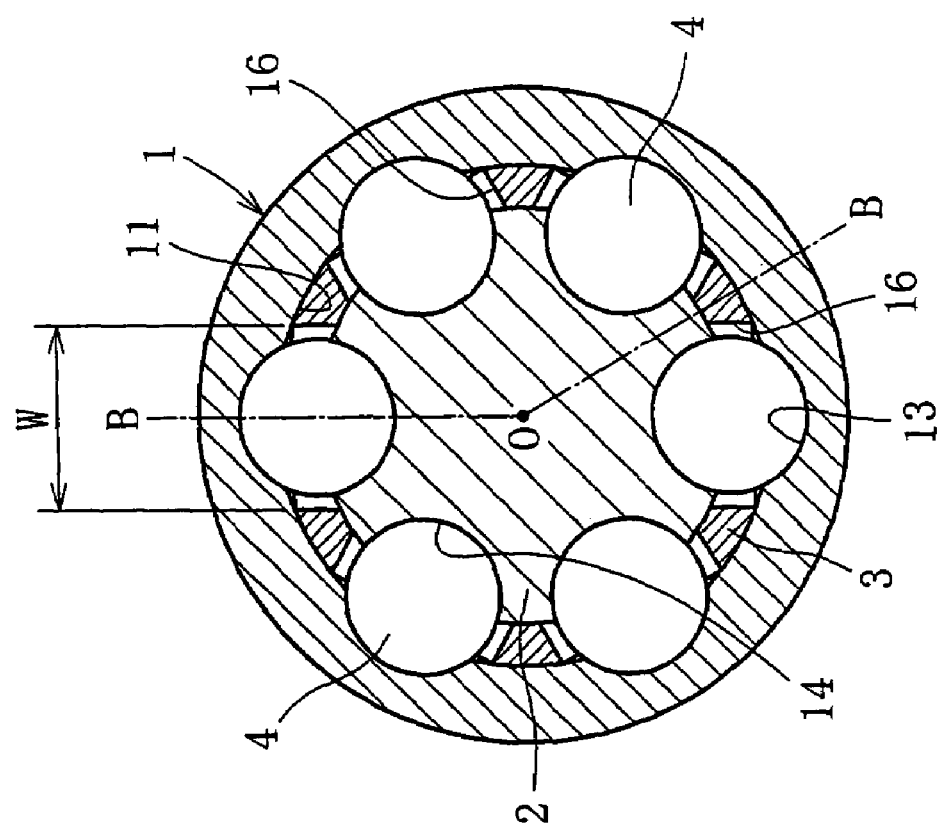
FIG. 1 shows an embodiment of the invention, wherein (a) is a sectional view taken along the line B-O-B in (b), which is a sectional view taken along the line A-O-A in (a)

FIG. 1(a) and (b) show an embodiment of the invention, illustrating a fixed type constant velocity joint of the UJ type, (a) being a sectional view taken along the line B-O-B in (b), which is a sectional view taken along the line A-O-A in (a) The fixed type constant velocity joint in this embodiment comprises a joint outer ring 1, a joint inner ring 2, a cage 3, and torque transmitting balls 4 (hereinafter referred to simply as balls), and a stem shaft 5.

Figure 2:
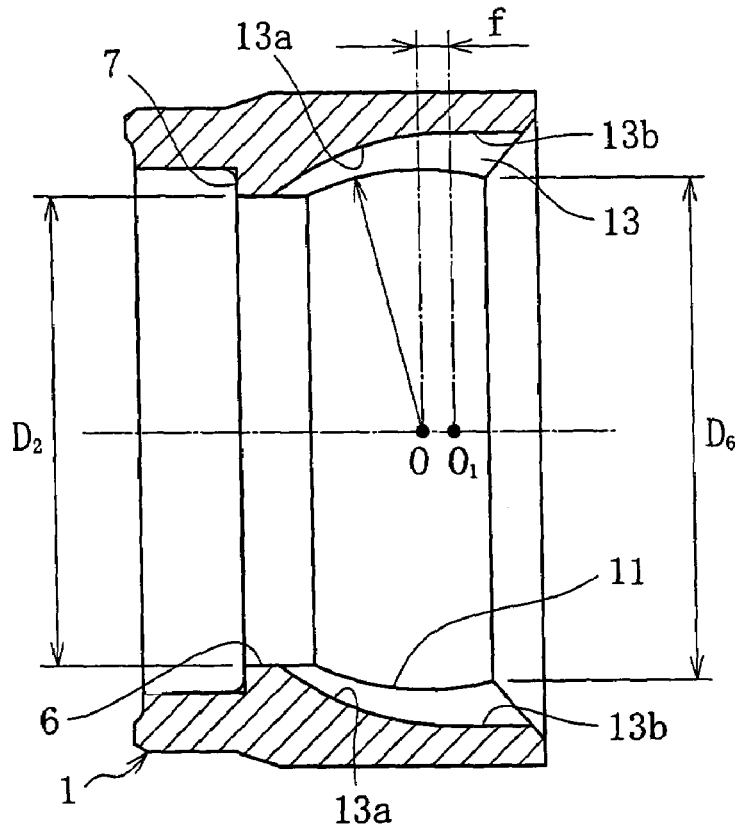
FIG. 2 is a sectional view showing a joint outer ring in FIG. 1(a)

The joint outer ring 1, as shown in FIG. 2, is in the form of a sleeve that opens at one end for joining the stem shaft 5 and opens at the other end to receive the joint inner ring 2, cage 3 and balls 4. One end side (stem side) of the joint outer ring 1 is formed with an inner cylindrical surface 6 having a minimum inner diameter $D_2$ larger than the outer diameter $D_1$ of the joint inner ring 2 to allow passage of the joint inner ring 2 during assembling to be later described. The axial end of the inner cylindrical surface 6 is formed with an annular step 7 to control the assembled position of the stem shaft 5. Further, on the other end side (mouth side) of the joint outer ring 1, the inner spherical surface 11 is formed with a plurality of circumferentially equispaced axially extending track grooves 13.

Figure 3A:
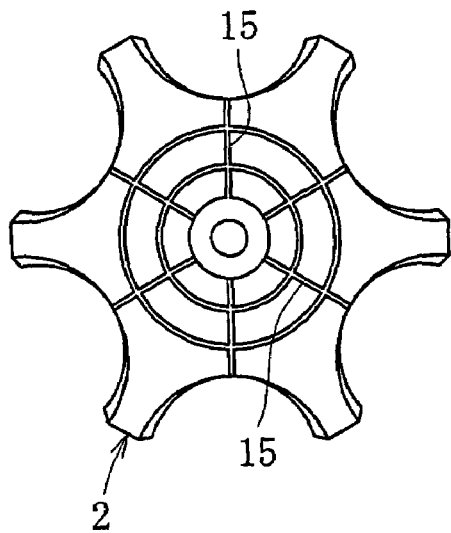
FIG. 3(a) is a left-hand side view of (b), which is a sectional view showing a joint inner ring in FIG. 1(a)
Figure 3B:
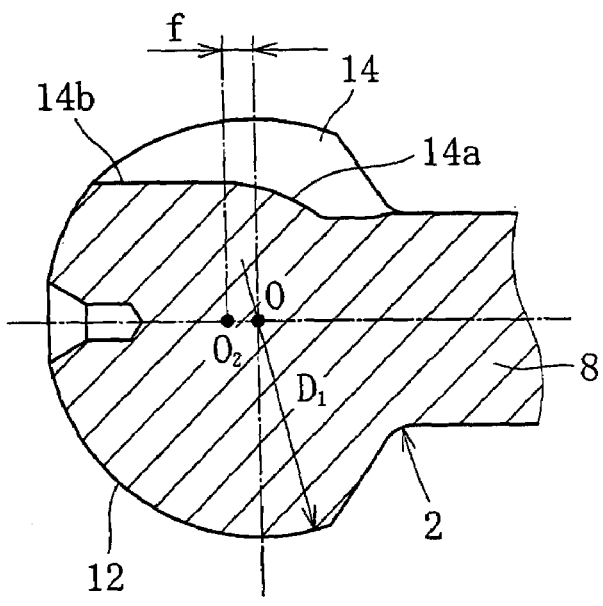

The joint inner ring 2, as shown in FIG. 3(a) and (b), is spherical, having an intermediate shaft 8 formed integral therewith, and has an outer spherical surface 12 formed with circumferentially equispaced axially extending track grooves 14 paired with the track grooves 13 in the joint outer ring 1. This joint inner ring 2 is received in the joint outer ring 1 such that it coincides with the central axis of the joint outer ring 1 when the operating angle is 0°. In addition, the axial peripheral region of the outer spherical surface 12 of the joint inner ring 2 is formed with oil grooves 15 for supply of a lubricant in order to smooth the movement of the outer peripheral surface 12 of the joint inner ring 2 with respect to the concave spherical surface 19 of the stem shaft 5, in consideration of the fact that the outer spherical surface 12 is supported by the concave spherical surface 19 of the stem shaft 5, as will be later described.

With this constant velocity joint of the UJ type, as shown in FIG. 1, the center of curvature, $O_1$, of the track grooves 13 in the joint outer ring 1 and the center of curvature, $O_2$, of the track grooves 14 in the joint inner ring 2 are axially offset by the same distance f with respect to the joint center O. Therefore, each track groove 13 in the joint outer ring 1 has an arcuate bottom 13a having the center of curvature, $0_1$, on the mouth opening side, and an axially parallel straight bottom 13b on the mouth opening side, with a boundary defined at the region where the line segment extending radially from said center of curvature, $O_1$, crosses the bottom of the track groove 13. Further, each track groove 14 in the joint inner ring 2 has an arcuate bottom 14a having the center of curvature, $O_2$, of the track grooves 14 on the mouth innermost side, and an axially parallel straight bottom 14b on the mouth innermost side, with a boundary defined at the region where the line segment extending radially from said center of curvature, $O_2$, crosses the bottom of the track groove 14.

The cage 3, as shown in FIGS. 1(a) and (b), is interposed between the inner spherical surface 11 of the joint outer ring 1 and the outer spherical surface 12 of the joint inner ring 2 and holds a plurality of balls 4 (in this embodiment, six balls). These balls 4 are held as received in a plurality of circumferentially equispaced pockets 16 (in this embodiment, six pockets) formed in the cage 3, and are disposed in the ball tracks defined by cooperation between the track grooves 13 and 14 in the joint outer and inner rings 1 and 2 so as to transmit torque. This cage 3 controls the balls 4 to position the latter always on a plane bisecting the angle between the stem shaft 5 and the intermediate shaft 8. The circumferential width W of the pocket 16 in the cage 3 (see FIG. 1(b)) is set at a value capable of allowing a maximum operating angle of the constant velocity joint.

Figure 4B:
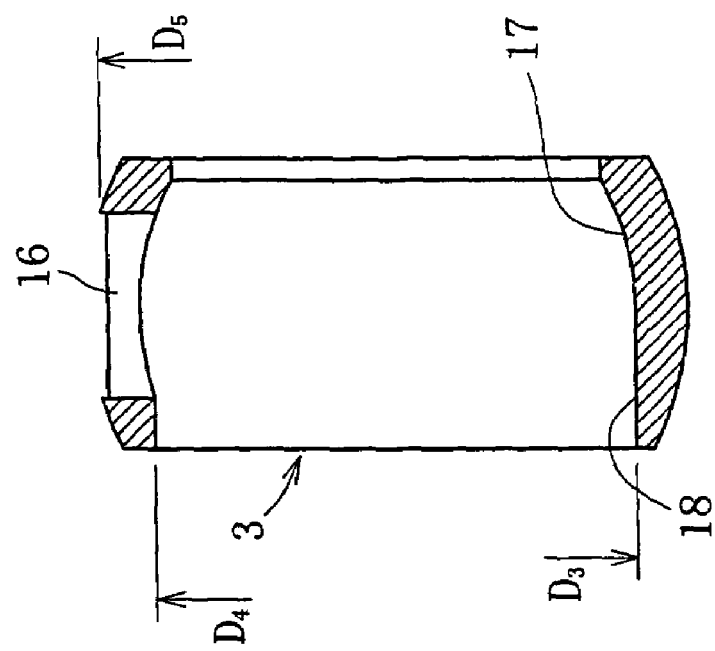
FIG. 4(a) is a left-hand side view showing a cage in FIG. 1(a), and (b) is a sectional view taken along the line C-O-C in (a)
Figure 4A:
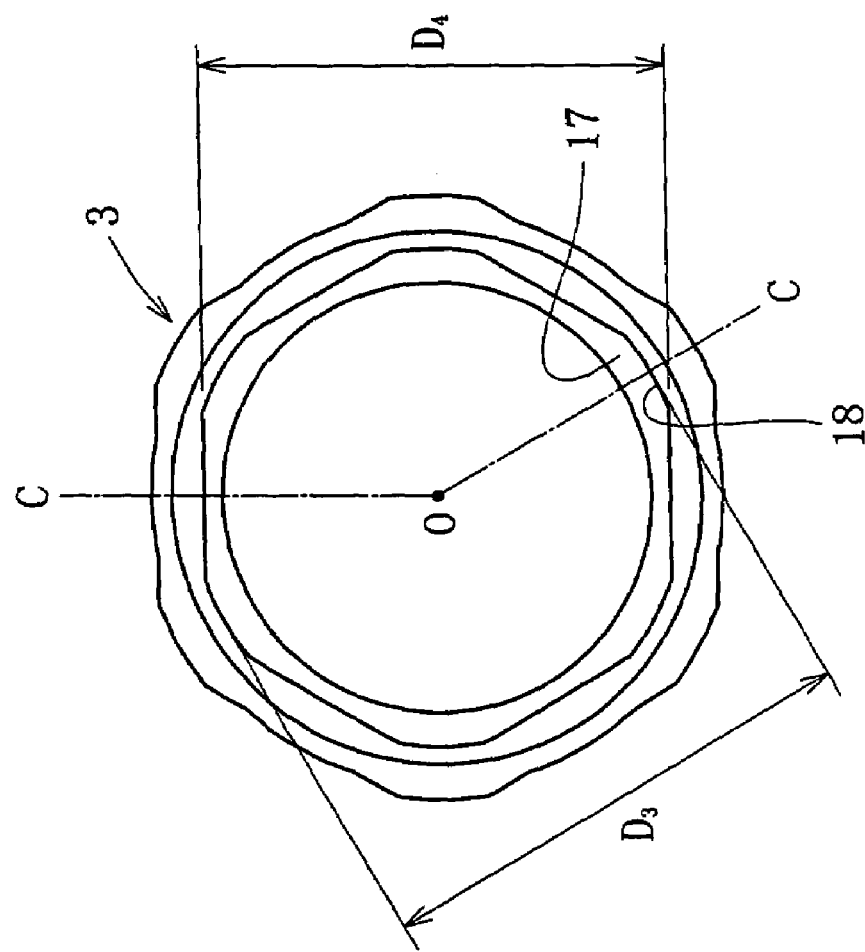

The inner diameter surface of the cage 3 is such that the mouth opening side located forwardly of the axial center (that, in the FIG. 1(a) state, coincides with the joint center O) becomes an inner spherical surface 17 contacting the outer spherical surface 12 of the joint inner ring 2, while the innermost side of the mouth located rearwardly of the axial center becomes an inner cylindrical surface 18 leading to the inner spherical surface 17. The inner cylindrical surface 18 of the cage 3 has an inner diameter $D_3$ coinciding with the outer diameter $D_1$ of the joint inner ring 2, as shown in FIG. 4(a) and (b), thus allowing the joint inner ring 2 to pass therethrough. Further, since the inner spherical surface 17 of the cage 3 coincides with the outer spherical surface 12 of the joint inner ring 2 when the joint inner ring 2 is in its normal position, the outer spherical surface 12 of the joint inner ring 2 is in abutment against the inner spherical surface 17 of the cage 3.

A rear open end of the joint outer ring 1 has an inner diameter larger than an outer diameter of the joint inner ring 2. An inner diameter surface of the cage 3 is a surface having a shape such that a region located forwardly of the center "O" of the fixed type constant velocity joint is capable of controlling the forward movement of the joint inner ring 2 while a region located rearwardly of the center "O" of the fixed type constant velocity joint is capable of allowing the axial movement of the joint inner ring 2.

In addition, the axial component of the torque load on the ball 4 is directed to the mouth opening in the joint outer ring 1. Thus, even if the mouth innermost side of the cage 3 formed with the inner cylindrical surface 18 is thin-walled, the mouth opening side of the cage 3 formed with the inner spherical surface 17 is thick-walled, so that the strength of the mouth opening side subjected to the axial component is secured. Further, since there is no possibility of the inner diameter $D_4$ of the cage 3 at the pocket 16 interfering with the insertion of the joint inner ring 2, it may be set smaller than the inner diameter $D_3$ at the inner cylindrical surface 18.

The stem shaft 5, which is the support section for axially supporting the joint inner ring 2, has the concave spherical surface 19 at its shaft end that coincides with the outer spherical surface 12 of the joint inner ring 2, and is coaxially fixed to the stem-side open end, which is the rear open end of the joint outer ring 1. That is, the shaft end of the stem shaft 5 is inserted into the stem-side open end of joint outer ring 1 and locked to the annular step 7, thereby controlling the axial position of the stem shaft 5. The stem shaft 5 is fixed to the joint outer ring 1 by welding at the weld region (the portion m in FIG. 1(a)) of the stem-side open end of the joint outer ring 1. With the stem shaft 5 thus fixed to the joint outer ring 1, the concave spherical surface 19 of the stem shaft 5 axially supports the outer spherical surface 12 of the joint inner ring 2.

In this constant velocity joint, the construction in which the concave spherical surface 19 of the stem shaft 5 disposed at the stem-side open end of the joint outer ring 1 axially supports the outer spherical surface 12 of the joint inner ring 2 while the inner cylindrical surface 18 of the cage 3 radially supports the outer spherical surface 12 of the joint inner ring 2, makes it possible to secure a sufficient torque load capacity, to prevent generation of vibration and abnormal sound, and to maintain the constant velocity property.

Next, the method of producing the fixed type constant velocity joint of this embodiment, that is, the assembling procedure for the various components consisting of the joint outer ring 1, joint inner ring 2, cage 3, balls 4, and stem shaft 5, will be described in detail below.

First, the cage 3 is inserted through the mouth-side open end, which is the front open end, of the joint outer ring 1 to assume its normal position within the joint outer ring 1. In this insertion of the cage 3 into the joint outer ring 1, if the outer diameter $D_5$ of the cage 3 at the pocket 16 (see FIG. 4(b)) is smaller than the inner diameter $D_6$ (see FIG. 2) of the inner spherical surface 11 of the joint outer ring 1, then, as shown in FIG. 5(a), with respect to the joint outer ring 1, the cage 3 is turned by ½ of the track forming angle α on the same axis to pass the cage pillars (regions between pockets) through the track grooves 13 until the cage is axially positioned, whereafter the cage 3 is turned again by ½ of the track forming angle α to assume its normal position. Further, if the outer diameter $D_5$ of the cage 3 at the pocket 16 is larger than the inner diameter $D_6$ of the inner spherical surface 11 of the joint outer ring 1, then, as shown in FIG. 5(b), the cage 3 is turned by 90° with respect to the joint outer ring 1 and inserted into the mouth innermost side, whereafter the cage 3 is turned again by 90° to assume its normal position.

Figure 6:
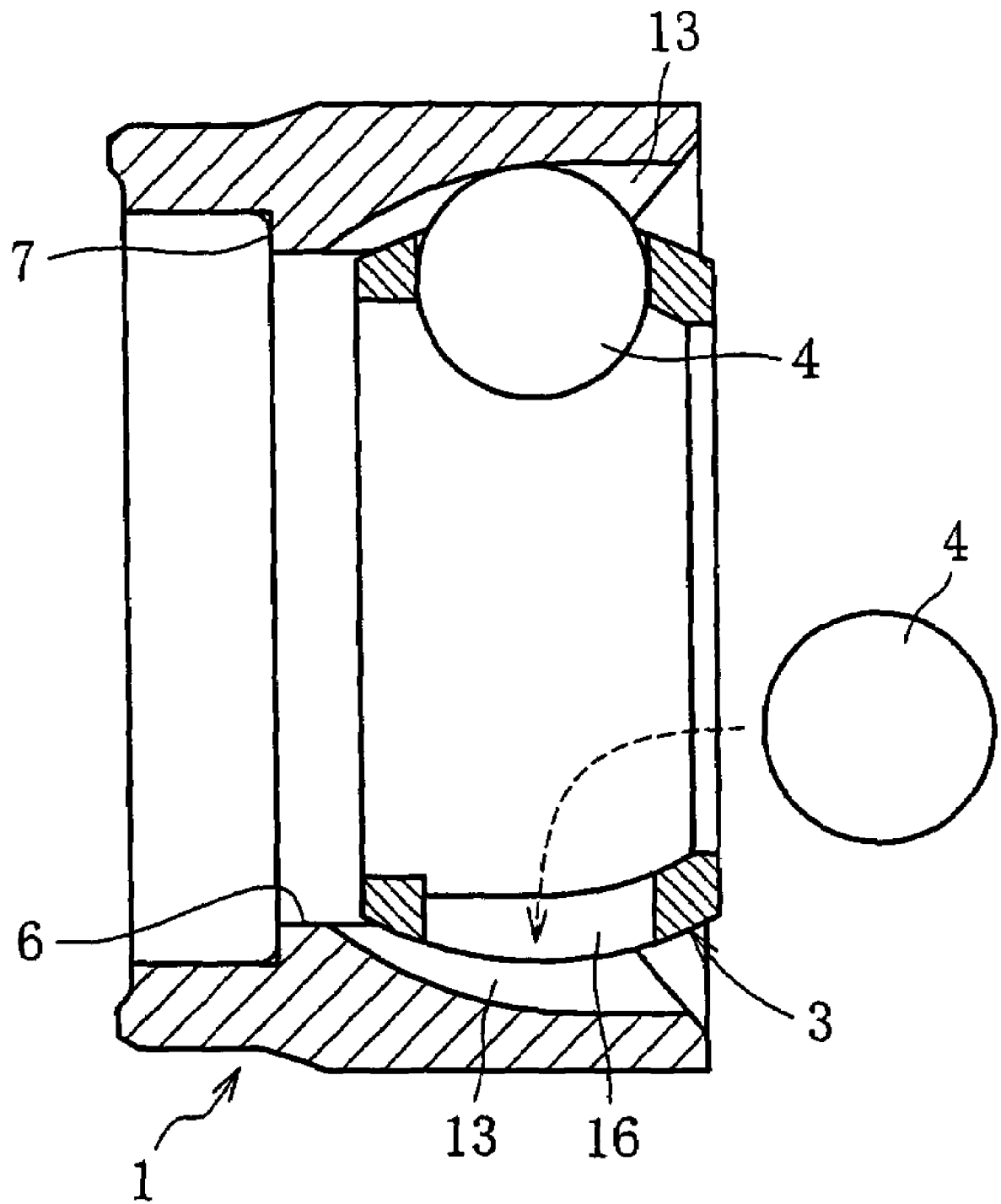
FIG. 6, which shows an embodiment of the invention, is a sectional view showing a procedure for assembling the balls to the cage.
Figure 7:
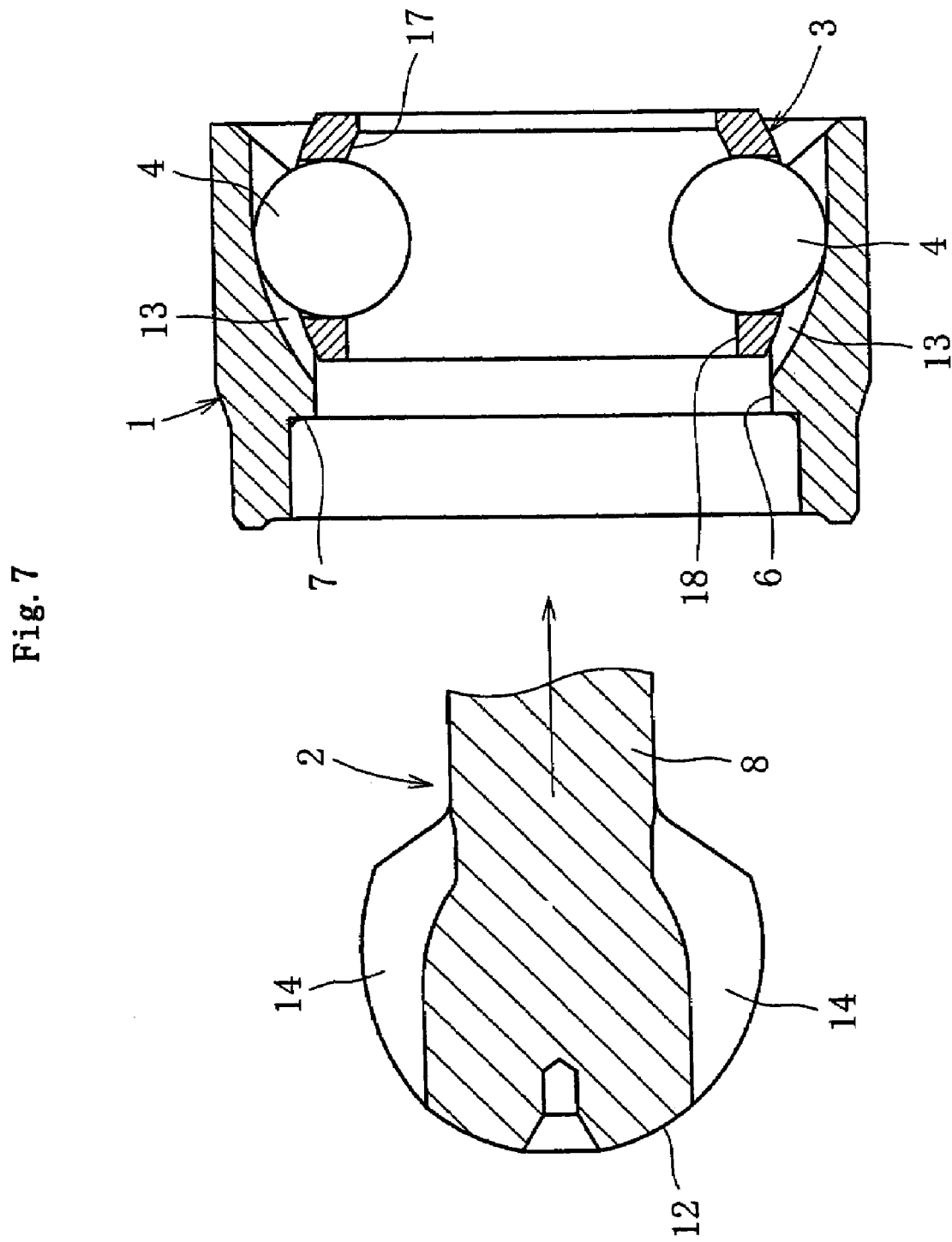
FIG. 7, which shows an embodiment of the invention, is a sectional view showing a procedure for assembling a joint inner ring to a cage.
Figure 8:
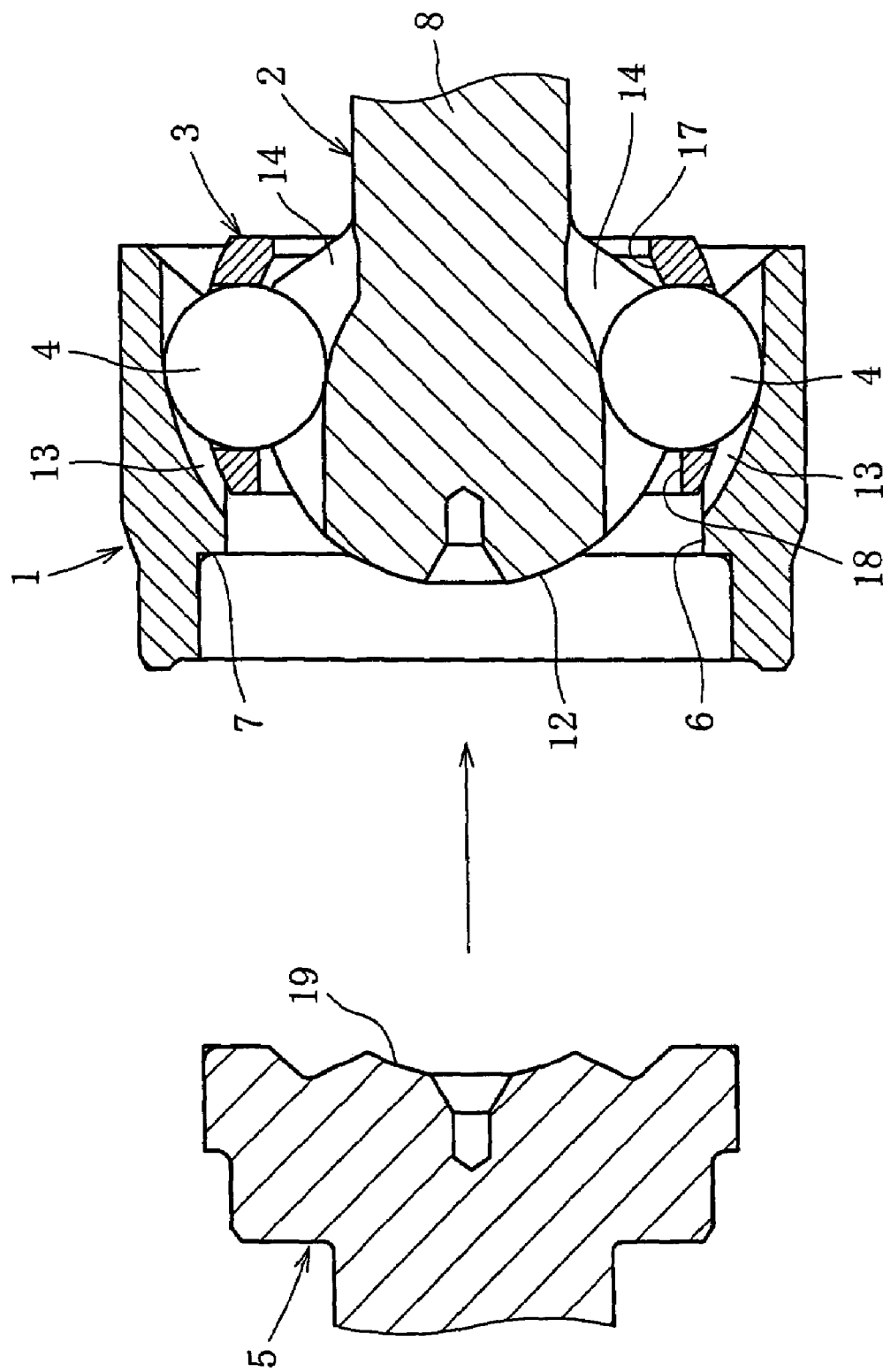
FIG. 8, which shows an embodiment of the invention, is a sectional view showing a procedure for assembling a stem shaft to a joint inner ring.

Subsequent to this incorporation of the cage 3, as shown in FIG. 6, the balls 4 are inserted into all of the pockets 16 of the cage 3. Next, as shown in FIG. 7, the joint inner ring 2 is inserted through the stem-side open end of the joint outer ring 1 with the joint outer ring 1 and the cage 3 brought into coincidence in axis and phase with each other and is passed through the inner cylindrical surface 18 of the cage 3 until the outer spherical surface 12 of the joint inner ring 2 abuts against its inner spherical surface 17, whereby the joint inner ring 2 assumes its normal position. And finally, as shown in FIG. 8, the stem shaft 5 is inserted through the stem-side open end of the joint outer ring 1, fitted in the inner cylindrical surface 6 of the joint outer ring 1, locked by the annular step 7, and fixed to the joint outer ring 1 by welding at the connecting region in the stem-side open end of the joint outer ring 1. With the stem shaft 5 thus fixed to the joint outer ring 1, the concave spherical surface 19 of the stem shaft 5 axially supports the outer spherical surface 12 of the joint inner ring 2.

In assembling the components consisting of the joint outer ring 1, cage 3, balls 4 and joint inner ring 2, first, the cage 3 is inserted through the stem-side open end of the joint outer ring 1 to assume its normal position, whereupon all of the balls 4 are inserted in the cage 3, whereafter, in incorporating the joint inner ring 2, the joint inner ring 2 can be inserted into the cage 3 through the stem-side open end of the joint outer ring 1 to assume its normal position since the stem-side open end of the joint outer ring 1 has the inner diameter $D_2$ larger than the outer diameter $D_1$ of the joint inner ring 2 and since the inner cylindrical surface 18 is formed in the inner diameter surface of the cage 3 on the mouth innermost side spaced from the axial center; thus, the assembling of the components can be simplified.

The constant velocity joint shown in FIGS. 9(a) and (b) is another embodiment of the invention, showing by way of example the use of a joint outer ring 1' formed by press work. The use of such press-worked joint outer ring 1' makes it easy to realize reductions in the weight and cost for constant velocity joints.

Figure 10:
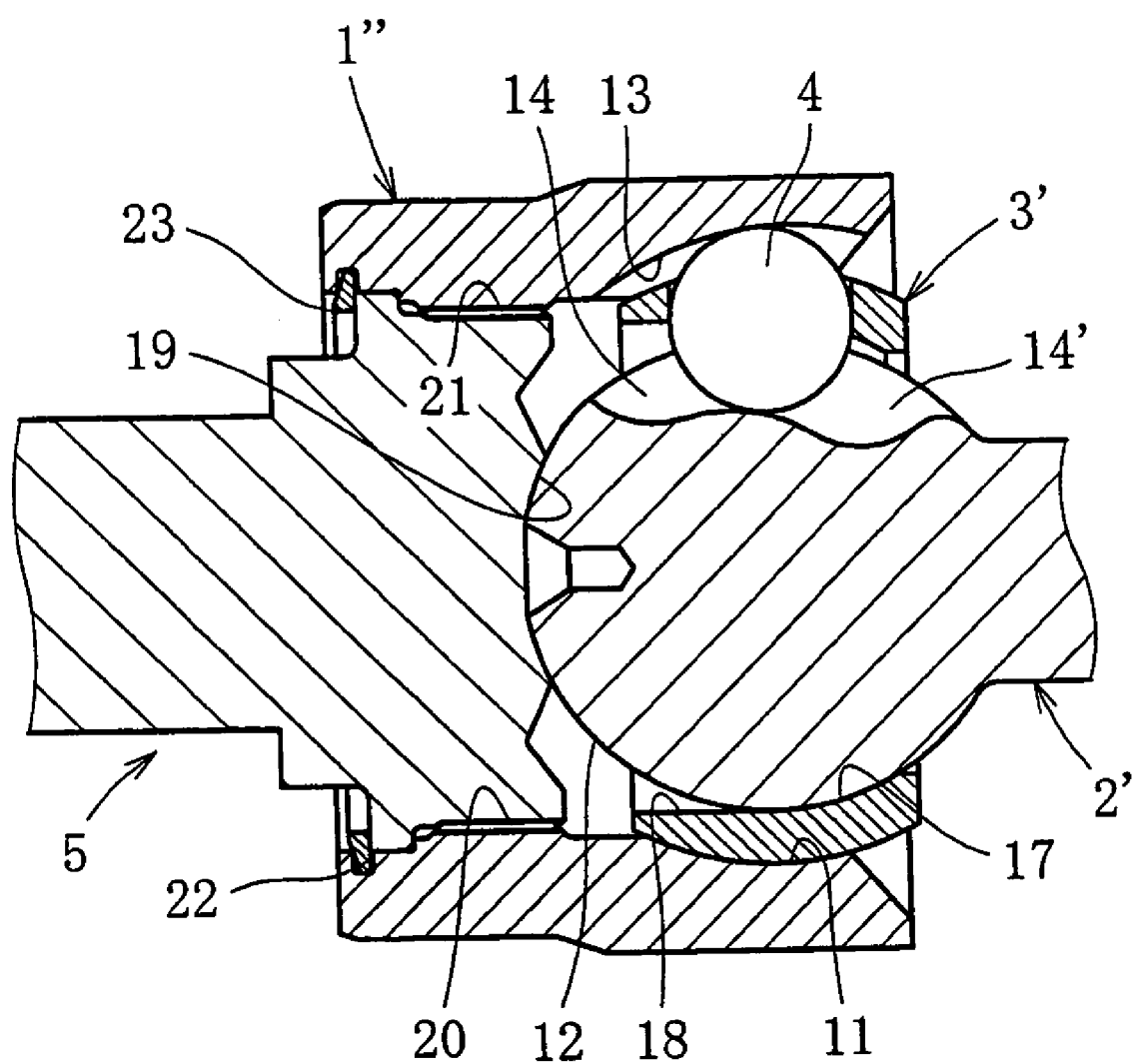
FIG. 10, which shows another embodiment of the invention, is a sectional view showing a fixed type constant velocity joint, wherein a stem shaft is serration-fitted in a joint outer ring and prevented by a clip from slipping off.

Whereas the embodiment described above shows by way of example the fixing of the stem shaft 5 to the joint outer ring 1 by welding at the weld region in the stem-side open end of the joint outer ring 1, it is also possible to employ a construction shown in FIG. 10 as another means for fixing the stem shaft to the joint outer ring. In the embodiment shown in FIG. 10, the inner cylindrical surface at the stem-side open end of the joint outer ring 1" is formed with serrations 20 and the outer peripheral surface of the stem shaft 5 is formed with serrations 21, so that the stem shaft 5 is fixed to the joint outer ring 1" by fitting between the serrations 20 and 21. Further, a clip 23 is insertion-mounted in an annular groove 22 formed in the stem-side open end of the joint outer ring 1" to prevent the stem shaft 5 from slipping off the joint outer ring 1". In addition, in FIG. 10, the fixed type constant velocity joint of the BJ type is shown, and the characters 2' and 3' denote the joint inner ring and the cage, respectively, in this embodiment.

Figure 11:
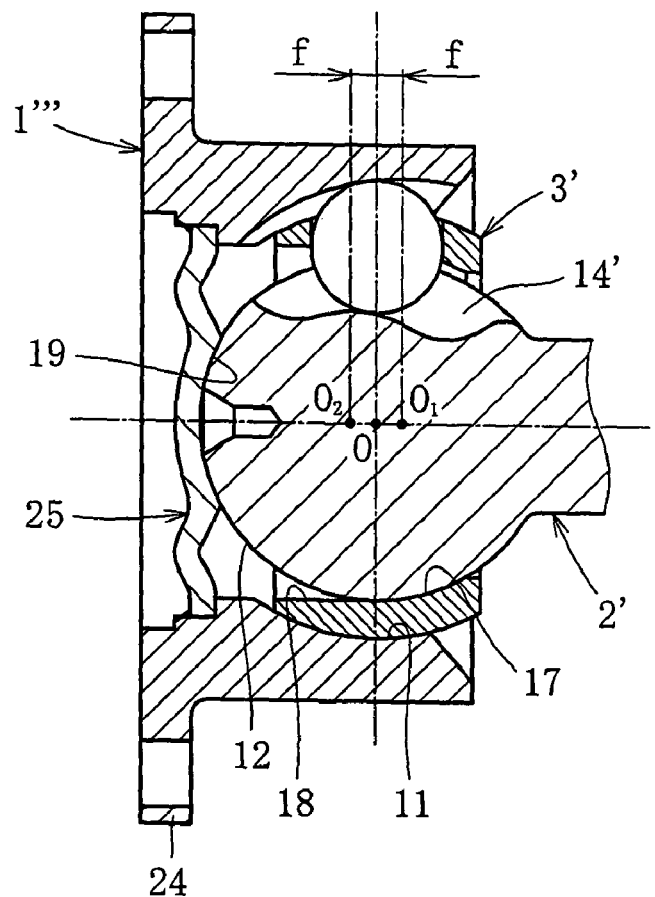
FIG. 11, which shows another embodiment of the invention, is a sectional view showing a fixed type constant velocity joint, wherein a receiving member for a joint inner ring is directly fixed to a joint outer ring.

An embodiment shown in FIG. 11 is a constant velocity joint of the type having no stem shaft, and as shown in the figure, it has a construction in which the joint outer ring 1''' is integrally formed with a flange 24 at the open end corresponding to the stem side and is mounted to another part as by bolts. In this case, a receiving member 25 formed with a concave spherical surface 19 is directly fixed to the joint outer ring 1''' and the concave spherical surface 19 of the receiving member 25 axially supports the outer spherical surface 12 of the joint inner ring 2. In addition, the receiving member 25 can be force-fitted in the inner cylindrical surface of the joint outer ring 1''' and fixed thereto by crimping.

Figure 12:
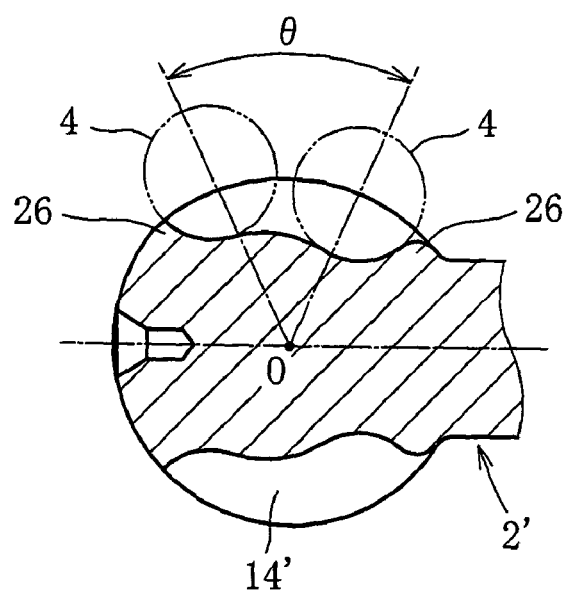
FIG. 12 is a sectional view showing the joint inner ring of FIGS. 10 and 11, wherein the track grooves are formed within a maximum operating angle range and an area outside the range is built up.

The joint inner ring 2' in the embodiment shown in FIGS. 10 and 11 is, as shown in FIG. 12, formed with track grooves 14' within the range of a maximum operating angle θ and shaped such that the area outside the range is defined by buildups 26. Shaping the track grooves 14' in the joint inner ring 2' in the form shown makes it possible to secure the strength of the portion between track grooves in the joint inner ring 2' to reduce the spacing between track grooves, achieving the size compaction of the constant velocity joint.

Whereas the previously described embodiment (see FIG. 1(a) and FIG. 9(a)) is of the construction in which the shaft end surface of the stem shaft 5 is formed with the concave spherical surface 19 for axially supporting outer spherical surface 12 of the joint inner ring 2, it is also possible, by utilizing the previously described receiving member 25 (see FIG. 11), to provide a separate structure consisting of the stem shaft and the receiving member 25 formed with the concave spherical surface 19.

Figure 13A:
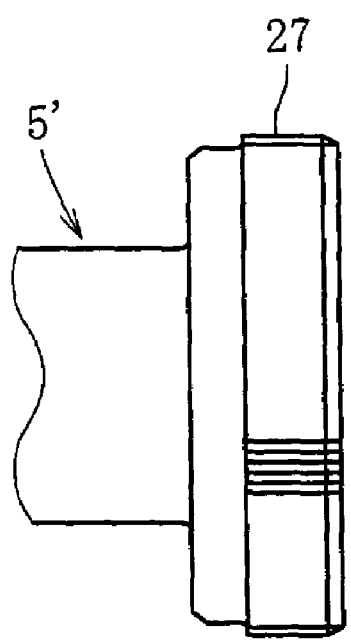
FIG. 13(a) is a front view showing a stem shaft formed with a serration-like projections on the outer periphery and (b) is a right-hand side view of (a)
Figure 13B:
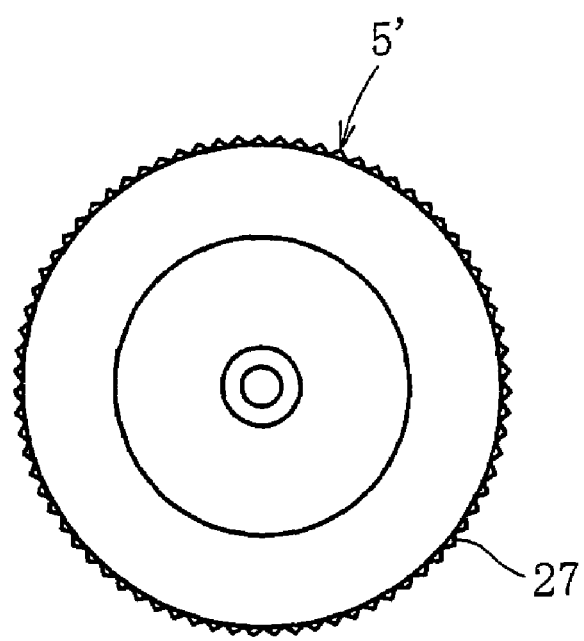
Figure 14:
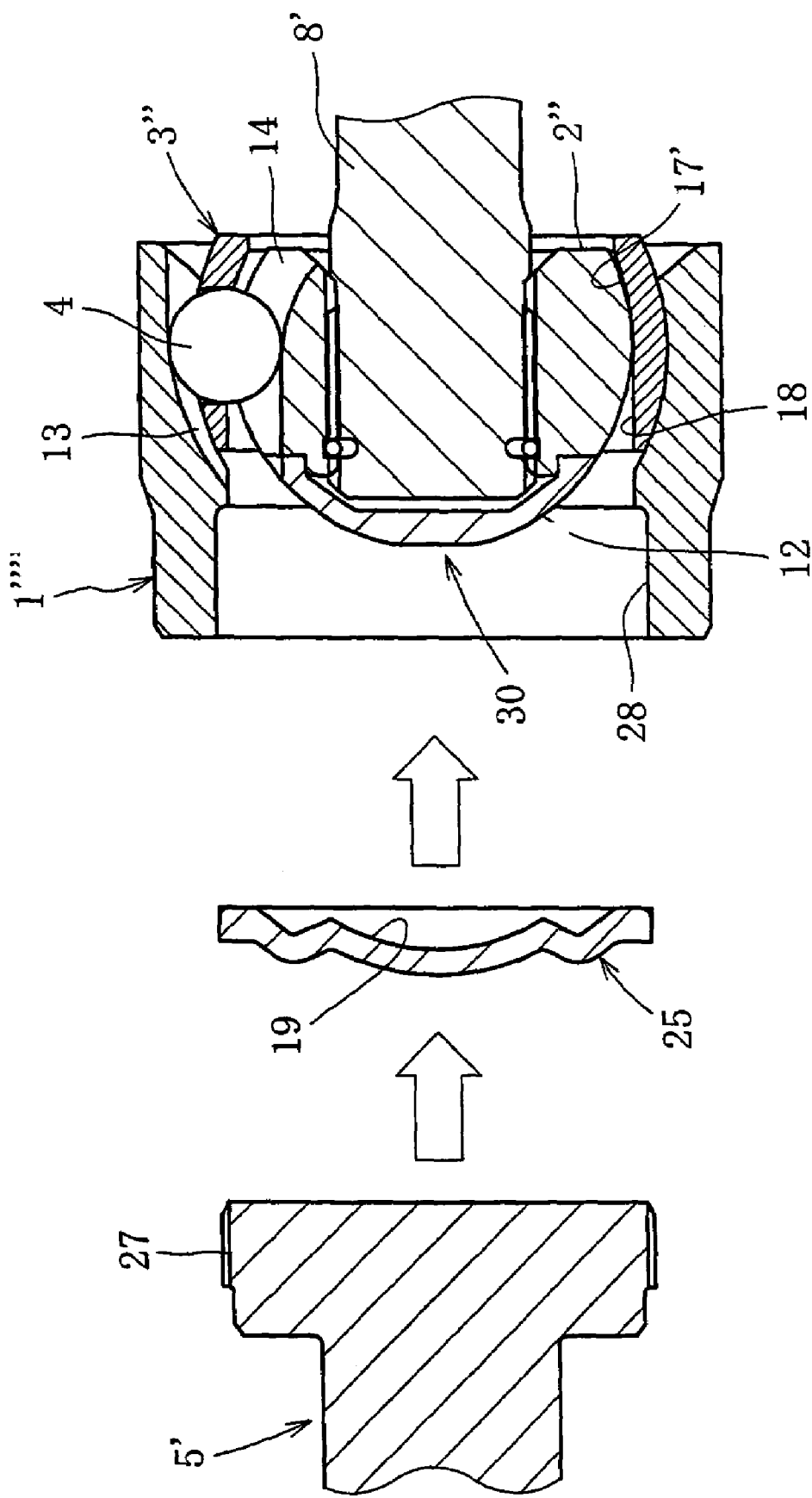
FIG. 14, which shows another embodiment of the invention, is an exploded sectional assembly view showing a procedure for assembling a stem shaft to a joint outer ring through a receiving member for a joint inner ring.
Figure 15A:
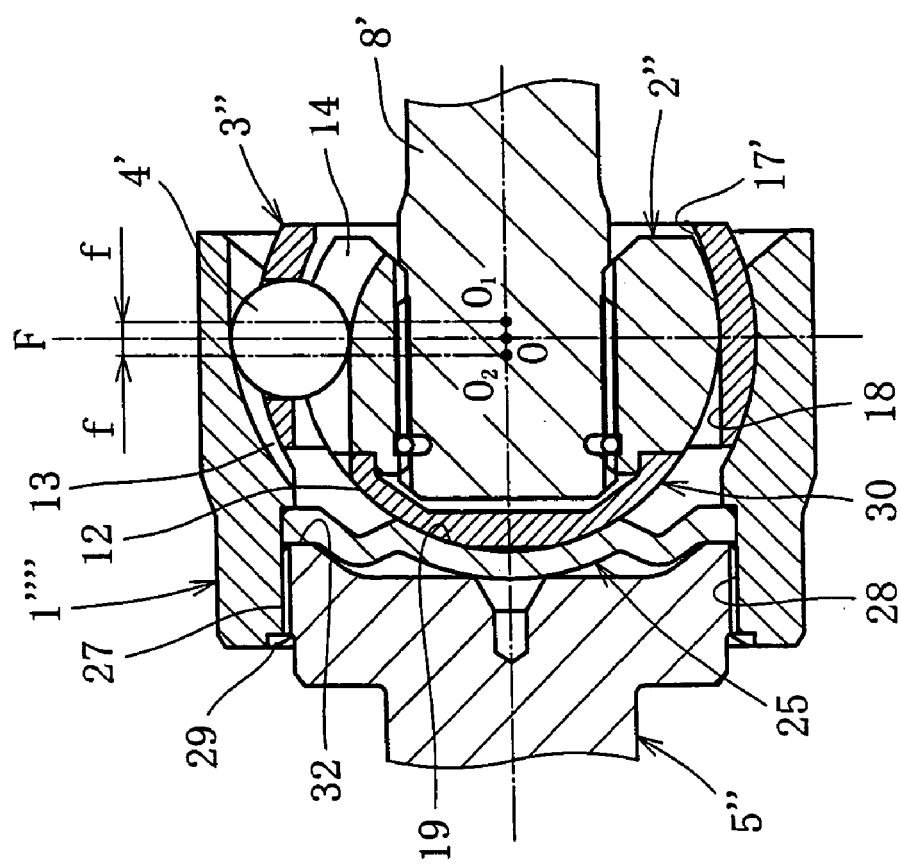
FIG. 15 shows the assembly completed state of FIG. 14, wherein (a) is a sectional view taken along the line G-O-G in (b), and (b) is a sectional view taken along the line F-O-F in (a)

In this embodiment, as shown in FIGS. 13(a) and (b), the outer peripheral surface of the stem shaft 5' is formed with serration-like projections 27, and a receiving member 25 formed with a concave spherical surface 19 as shown in FIG. 14 is force-fitted into the inner cylindrical surface 28 of a joint outer ring 1'''', whereupon the stem shaft 5' is inserted until it abuts against the receiving member 25, causing the serration-like projections 27 on the stem shaft 5' to cut into the inner cylindrical surface 28 of the joint outer ring 1'''' and thereby plastically joined thereto, and torque transmission is effected by this plastically joining section. Further, the axial fixing, as shown in FIGS. 15(a) and (b) and FIG. 16, can be effected by a construction in which a crimping section 29 is formed at the stem-side open end of the joint outer ring 1''''. The embodiment shown in FIGS. 14 and 15 (a) and (b) shows a fixed type constant velocity joint of the UJ type, wherein the characters 2'', 3'' and 5'' denote the joint inner ring, cage and stem shaft, respectively, shown in other embodiments.

In addition, this embodiment is of the construction in which a member 30 separate from the joint inner ring 2'' formed with an outer spherical surface 12 is fitted in the mouth innermost side of the joint inner ring 2''. Further, this embodiment, unlike the previously described embodiment (see FIGS. 1(a) and 9(a)) having the joint inner ring 2 integral with the intermediate shaft 8, has a construction in which the intermediate shaft 8' and the joint inner ring 2'' are constructed as separate bodies and the intermediate shaft 8' is serration-fitted in the joint inner ring 2'' to allow torque transmission.

Figure 1B:
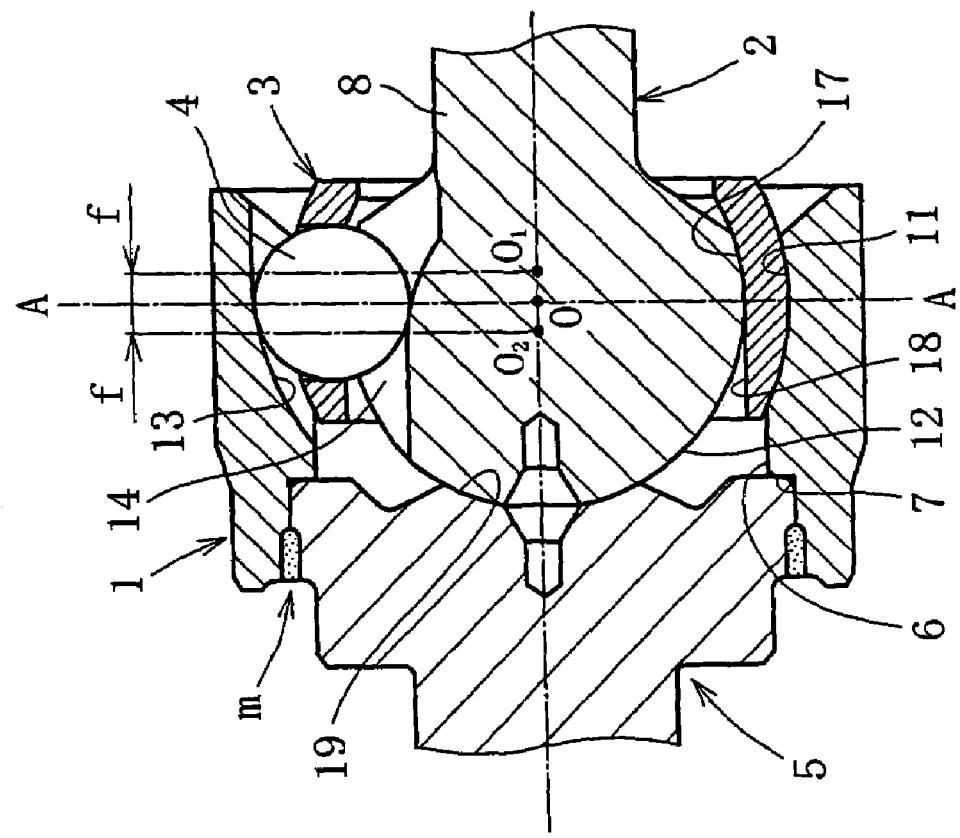
Figure 15B:
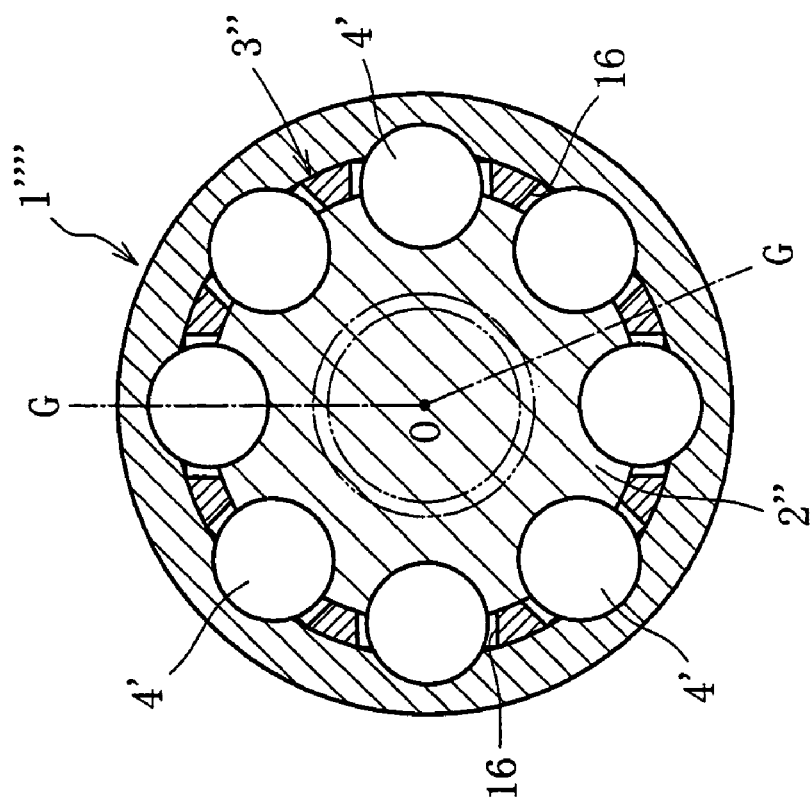
Figure 16:
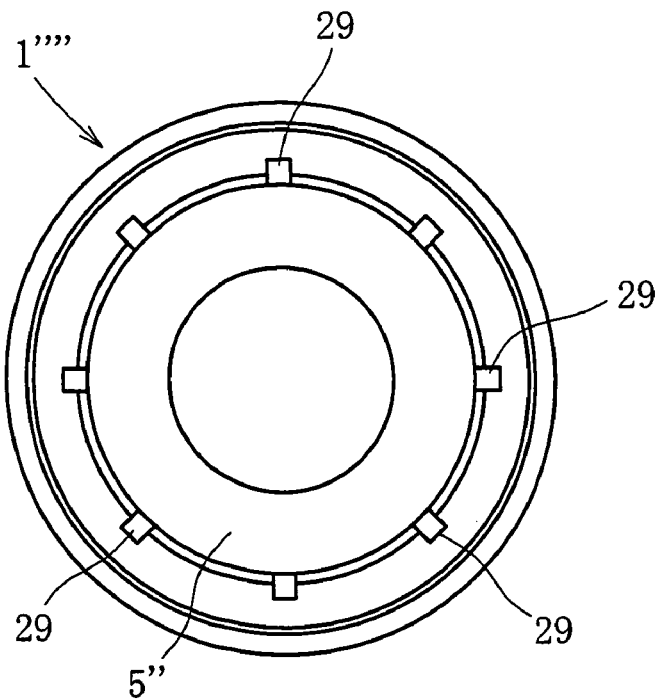
FIG. 16 is a left-hand side view of FIG. 15(a)

Whereas the previously described embodiment (see FIGS. 1(b) and 9(b)) shows the case where six balls 4 are held by the cage 3, this embodiment, as shown in FIG. 15(b), has eight balls 4'. The construction using eight balls 4' is effective in that the ball diameter can be reduced to enable size reduction of the entire joint.

Figure 17:
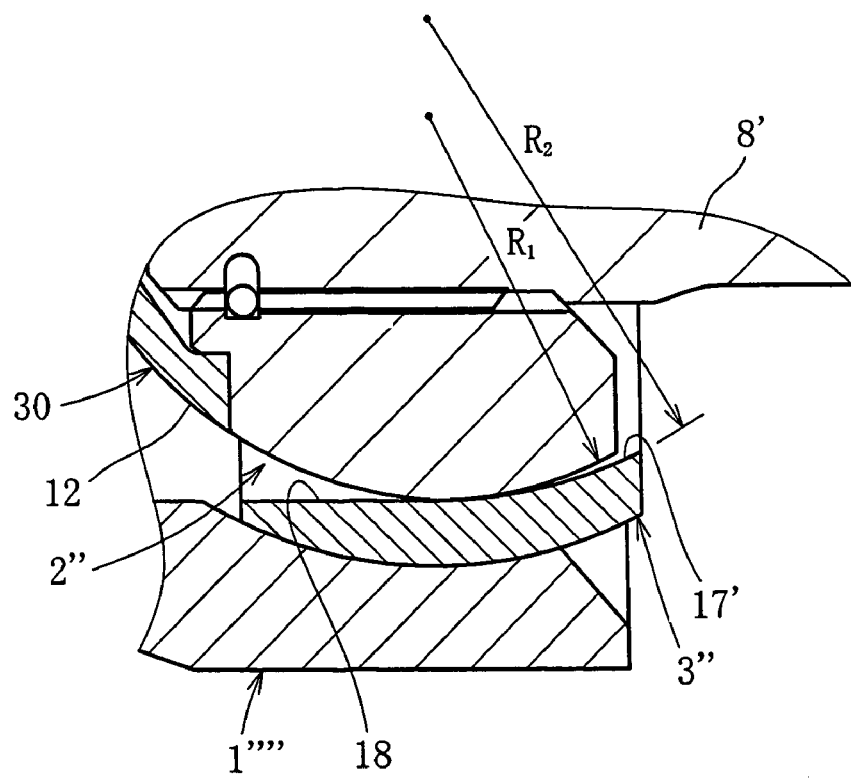
FIG. 17 is a principal enlarged sectional view of FIG. 15(a)

Further, as shown in FIG. 17, the radius of curvature, $R_1$, of the outer spherical surface 12 of the joint inner ring 2'' is set smaller than the radius of curvature, $R_2$, of the inner spherical surface 17 of the cage 3''. This reduces contact between the joint inner ring 2'' and the cage 3'', to make smooth the movement of the cage 3'', reducing the force from the balls 4' to push the cage 3''.

Figure 18B:
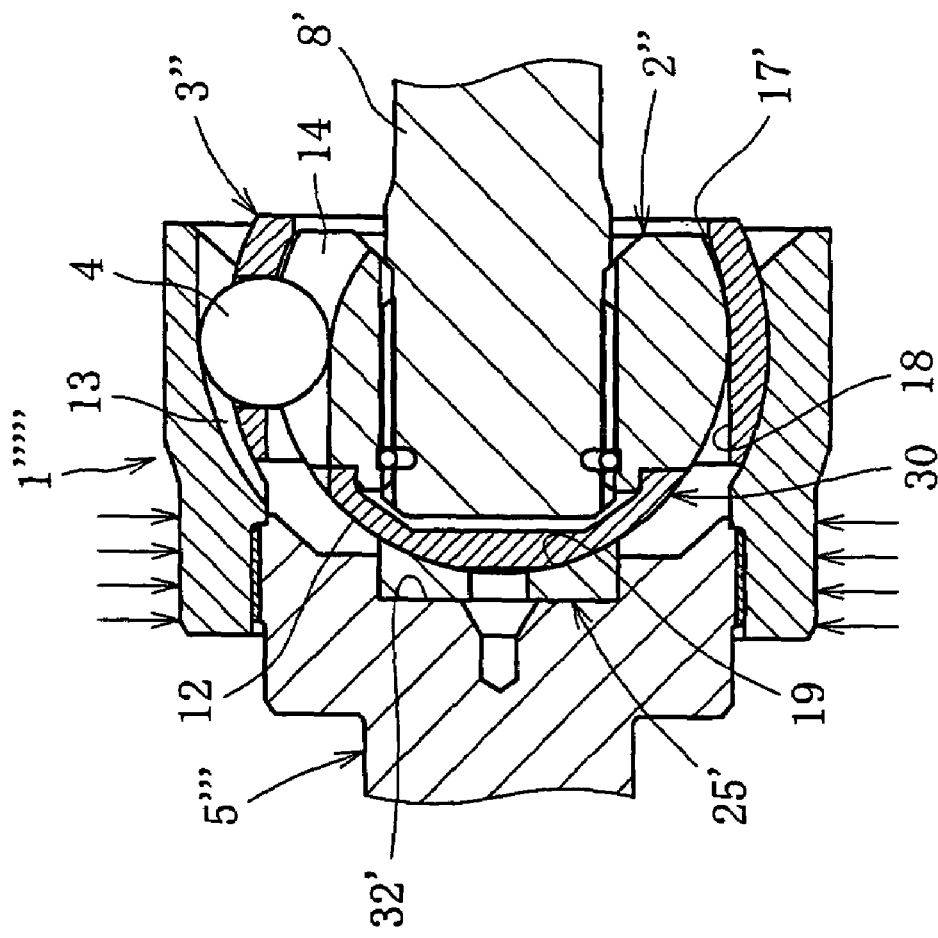
FIG. 18(a) is a front view showing a stem shaft whose outer periphery is knurled and (b) is a sectional view showing fixed type constant velocity joint having the stem shaft of (a) assembled thereto.
Figure 18A:
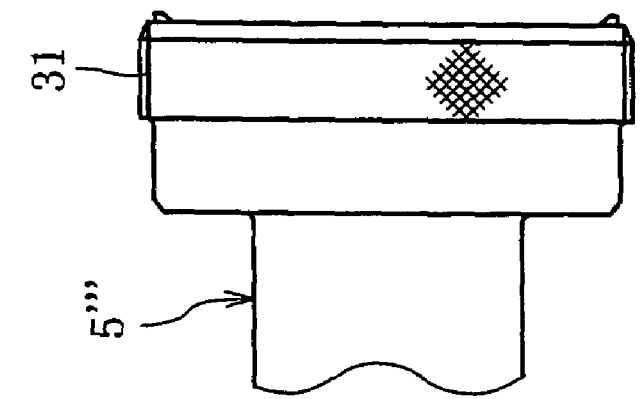

Further, as shown in FIGS. 18(a) and (b), the joint has a construction in which the outer peripheral surface of the stem shaft 5''' is formed with knurling-like projections 31, and the stem shaft 5''' is inserted into the stem-side open end of the joint outer ring 1''''' and fixed there by diametrically contracting the joint outer ring 1''''' under a force from outside the joint outer ring 1''''' and in which the concave spherical surface 19 of the receiving member 25' fitted in the recess 32' in the stem shaft 5''' axially supports the outer spherical surface 12 of the joint inner ring 2''.

What is claimed is:

1. A fixed type constant velocity joint characterized by comprising:

a cylindrical joint outer ring having an inner spherical surface formed with a plurality of circumferentially equispaced axially extending track grooves, a joint inner ring having an outer spherical surface formed with circumferentially equispaced axially extending track grooves paired with the track grooves in the joint outer ring, a plurality of torque transmitting balls disposed in ball tracks defined by cooperation between the track grooves in the joint outer and inner rings, and a cage for holding the torque transmitting balls disposed in said ball tracks, wherein a center of curvature of the track grooves in the joint outer ring and a center of curvature of the track grooves in the joint inner ring are axially offset by the same distance with respect to a center of the fixed type constant velocity joint, each of the track grooves in the joint outer ring has an arcuate bottom in a mouth innermost side of the joint outer ring, and a straight bottom on a mouth opening side of the joint outer ring, each of the track grooves in the joint inner ring has an arcuate bottom on the mouth opening side of the joint outer ring, and a straight bottom on the mouth innermost side of the joint outer ring, and a rear open end of said joint outer ring opposite to the mouth opening side of said joint outer ring has an inner diameter larger than an outer diameter of the joint inner ring, an inner diameter surface of said cage is a surface having a shape such that a first region of the cage located forwardly of the center of the fixed type constant velocity joint is capable of controlling the forward movement of the joint inner ring while a second region of the cage located rearwardly of the center of the fixed type constant velocity joint is capable of allowing the axial movement of the joint inner ring.

2. A fixed type constant velocity joint as set forth in claim 1, characterized in that the outer spherical surface is formed to extend to the rear of the joint inner ring while the end surface of a receiving section located rearwardly of said joint inner ring is formed with a concave spherical surface, whereby the outer spherical surface of said joint inner ring is axially supported by the concave spherical surface of said receiving section.

3. A fixed type constant velocity joint as set forth in claim 2, characterized in that the radius of curvature of the outer spherical surface of the joint inner ring is set smaller than that of the inner spherical surface of the cage.

4. A fixed type constant velocity joint as set forth in claim 2, characterized in that said receiving section is provided by a stem shaft fixed to the rear open end of the joint outer ring.

5. A fixed type constant velocity joint as set forth in claim 1, characterized in that the center of curvature of the track grooves in the joint outer ring is located on an exterior side of the joint center, and the center of curvature of the track grooves in the joint inner ring is located on an interior side of the joint center.

* * * * *